US012592970B2

(12) United States Patent
Tang et al.

(10) Patent No.: US 12,592,970 B2
(45) Date of Patent: Mar. 31, 2026

(54) SYSTEMS AND METHODS FOR NON-EQUAL BOUNDARY SECURITY POLICY APPLICATION IN A NETWORK APPLIANCE

(71) Applicant: Fortinet, Inc., Sunnyvale, CA (US)

(72) Inventors: Frederick Tang, Palantine, IL (US);
Shushan Wen, Pleasant Hill, CA (US)

(73) Assignee: Fortinet, Inc., Sunnyvale, CA (US)

( * ) Notice: Subject to any disclaimer, the term of this patent is extended or adjusted under 35 U.S.C. 154(b) by 267 days.

(21) Appl. No.: 18/208,376

(22) Filed: Jun. 12, 2023

(65) Prior Publication Data

US 2024/0414202 A1 Dec. 12, 2024

(51) Int. Cl.
*H04L 9/40* (2022.01)
*H04L 41/0894* (2022.01)

(52) U.S. Cl.
CPC .......... *H04L 63/20* (2013.01); *H04L 41/0894* (2022.05)

(58) Field of Classification Search
CPC ............................ H04L 63/20; H04L 41/0894
See application file for complete search history.

(56) References Cited

U.S. PATENT DOCUMENTS

| | | | | |
|---|---|---|---|---|
| 6,587,466 | B1 * | 7/2003 | Bhattacharya | ...... H04L 41/0895 370/395.43 |
| 2011/0289550 | A1 * | 11/2011 | Nakae | ................... G06F 21/604 726/1 |
| 2018/0025157 | A1 * | 1/2018 | Titonis | ................ H04W 12/128 726/22 |

* cited by examiner

*Primary Examiner* — Sm A Rahman
(74) *Attorney, Agent, or Firm* — Jaffery Watson Hamilton & DeSanctis LLP

(57) ABSTRACT
Various embodiments provide systems and methods for applying network policies to network traffic based upon a non-equal boundary search tree.

22 Claims, 8 Drawing Sheets

100

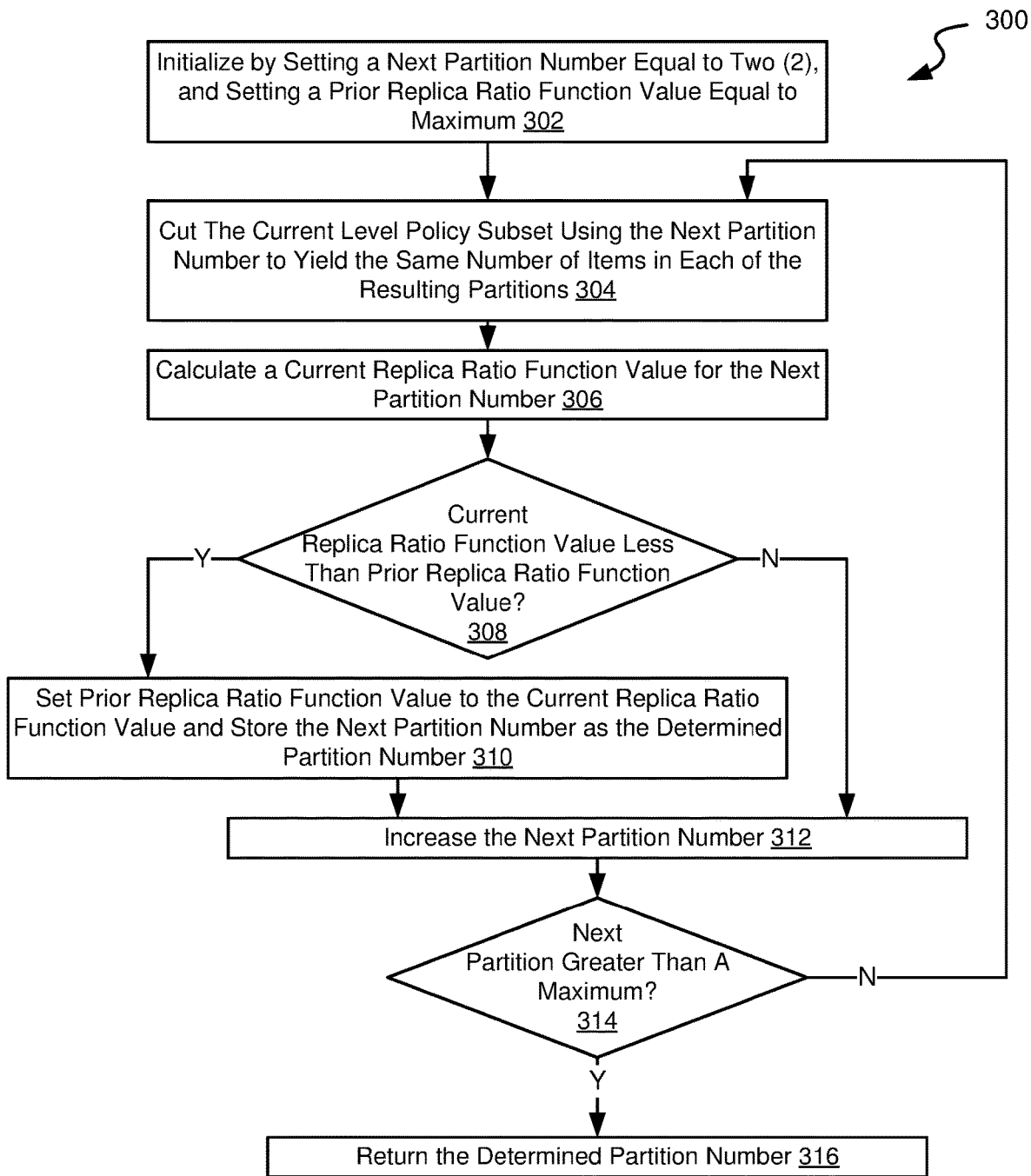

300

Initialize by Setting a Next Partition Number Equal to Two (2), and Setting a Prior Replica Ratio Function Value Equal to Maximum 302

Cut The Current Level Policy Subset Using the Next Partition Number to Yield the Same Number of Items in Each of the Resulting Partitions 304

Calculate a Current Replica Ratio Function Value for the Next Partition Number 306

Current Replica Ratio Function Value Less Than Prior Replica Ratio Function Value? 308

Y

N

Set Prior Replica Ratio Function Value to the Current Replica Ratio Function Value and Store the Next Partition Number as the Determined Partition Number 310

Increase the Next Partition Number 312

Next Partition Greater Than A Maximum? 314

N

Y

Return the Determined Partition Number 316

FIG. 3

SYSTEMS AND METHODS FOR NON-EQUAL BOUNDARY SECURITY POLICY APPLICATION IN A NETWORK APPLIANCE

COPYRIGHT NOTICE

FIELD

Embodiments discussed generally relate to systems and methods for efficiently applying network policies to network traffic, and more particularly to a non-equal boundary policy set search tree based application of network policies to network traffic.

BACKGROUND

It is typical for a network processor to apply a set of policies to network packets traversing the network processor. To do this, network policies applicable to each network packet must be first identified, and second applied to the network packet. It is common for network processors to handle a high volume and a high rate of network packets. Current network processors utilize an even boundary policy search tree which can result in one or more unnecessary search levels when identifying network policies applicable to a given network packet. Such additional search levels reduce the efficiency of processing network traffic.

Accordingly, there is a need in the art for advanced systems and methods for applying a set of policies to network traffic.

SUMMARY

Various embodiments provide systems and methods for applying network policies to network traffic based upon a non-equal boundary search tree.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIGS. 2-4 illustrate a policy cutting application configured to generate a non-equal boundary policy set search tree in accordance with various embodiments;

DETAILED DESCRIPTION

Figure 1A:
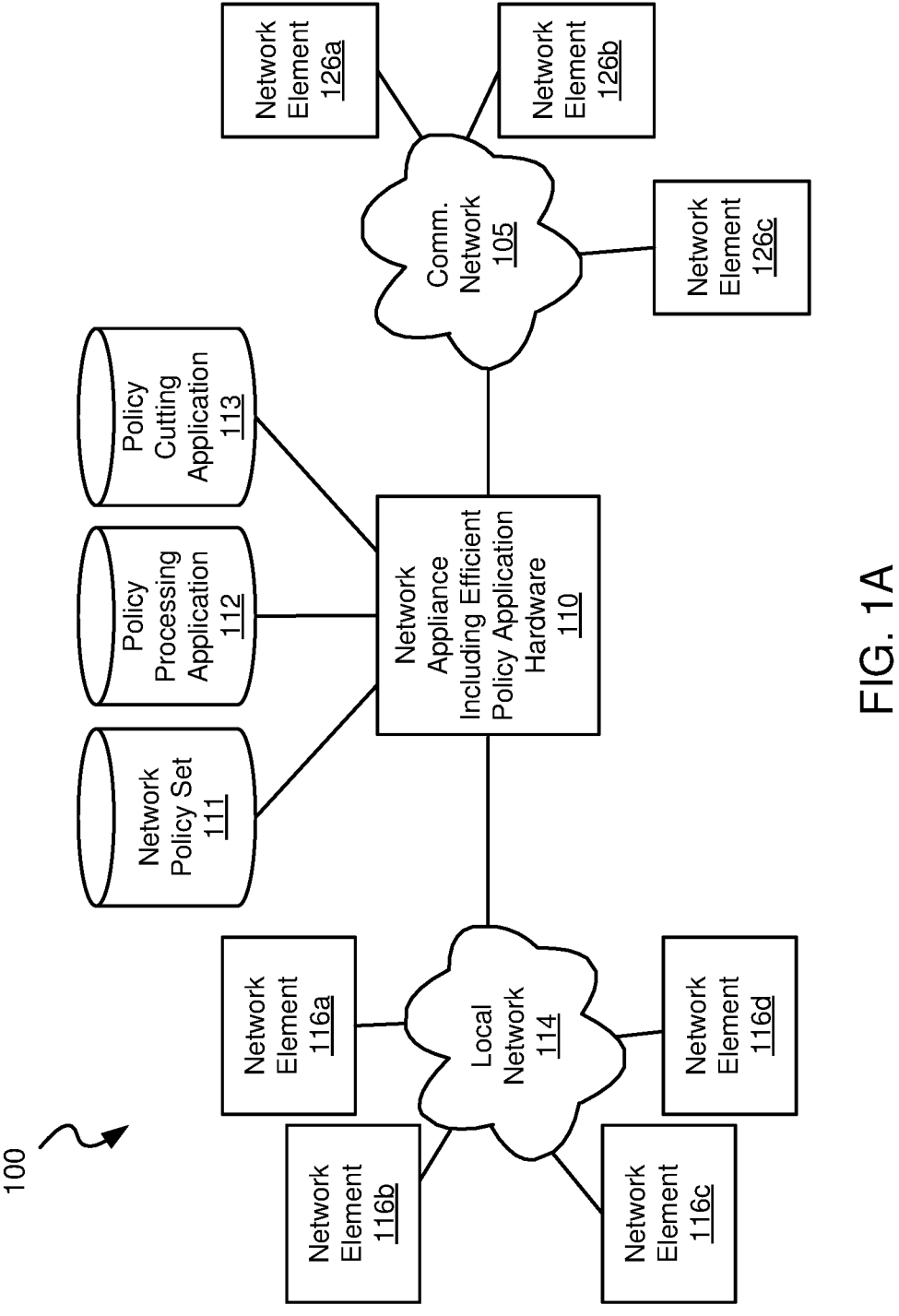
FIGS. 1A-1C illustrate a network architecture including a network appliance including efficient policy application hardware and executing a policy cutting application and a policy processing application in accordance with some embodiments.

Various embodiments provide systems and methods for applying network policies to network traffic based upon a non-equal boundary search tree.

It has been found that equal boundary policy set search trees result in non-efficient processing of network traffic using the aforementioned search trees to identify policies applicable to a received network packet. Each node in such an equal boundary policy set search trees are generated has a boundary range on a number of dimensions (source IP address, destination IP address, protocol, source port, destination port, etc.) and all policies in that node will be within these boundary ranges. The child nodes are created by first choosing one of the dimensions, then choosing a number of partitions into which the chosen dimension is to be divided. The number of partitions is then generated such that each partition has the same range or width of the chosen dimension. As an example, where a chosen dimension has a range from 1001 to 2000 and the number of partitions is four (4), each partition or child node would have an equal range of two-hundred, fifty (250) (i.e., 1001-1250; 1251-1500; 1501-1750; and 1751-2000). Each of the aforementioned child nodes can then be similarly partitioned into equal range sub-nodes until the number of policies corresponding to any final node (i.e., leaf node) corresponds to fewer than a defined number of policies. While this approach is simple to implement, it can often result in an asymmetric search tree with some searches requiring more levels in the search tree to complete than others due to the sparsity of policies in some parts of the range and the density of policies in other parts of the range. The difference in the number of levels for some searches compared with others results in a differential latency for network packets traversing a network appliance.

Because the partitions are always evenly split (i.e., equal ranges), the network appliance does not have to examine the boundaries of every single child when performing policy search; it only needs two (2) parameters, the boundary of the node and the number of partitions, to determine which child to traverse, using either a division operation, or a hardware accelerator that bypasses divisions, to find the child with the correct boundary, which costs only a low number of clock cycles. However, the efficiency using evenly split boundaries is not always optimal. Thus, different values of PNR are tested (between 2 to MAX_PNR) and a formula determines which PNR to use. However, it has been found that selectively modifying the number of partitions does not yield search efficiencies possible with a non-equal boundary policy set search tree as disclosed herein, especially when the difference between the minimum and the maximum boundary values for a dimension get very large.

Various embodiments discussed herein utilize a non-equal boundary policy set search tree to identify policies applicable to a received network packet. The non-equal boundary policy set search tree is configured to reduce a number of search levels required to identify applicable policies by allowing different search ranges within a given level of a search tree. These differences in search ranges result in the aforementioned non-equal boundary policy set search tree. This is in direct comparison to an equal boundary policy set search tree where the search ranges within a given level of a search tree are required to be the same.

Various types of network appliances including network processors (NPs) rely upon a set of policies to be applied to network traffic depending upon the type of network traffic. As an example, one policy in the set of policies may be applied to network traffic having a destination address within a first defined range, and another policy in the set of policies may be applied to network traffic having a source address within a second defined range. As such network appliances are designed to process high volumes of network packets and must perform the processing at high rates (e.g. millions per second), the identification of which policies to apply to a given network packet and application of the identified policies must be done very fast to avoid increasing the latency in the network. As will be appreciated by one of ordinary skill in the art, reducing latency has a direct impact on network bandwidth.

Various embodiments discussed herein use a search tree to identify which policy or policies that are to be applied to a given network packet. Each node in the search tree represents a range of a search field that when matched yields potentially a child node representing a subsequent search or a leaf node representing one or more policies that are to be applied to the received network packet. Once a search of the search tree using a received network traffic matches a leaf node, the one or more policies associated with the leaf node are applied to the received network traffic. The number of levels (i.e., parent, child, and grandchildren levels) in the search tree directly impacts the time required to identify policies from a set of policies that are applicable to the received network traffic. Thus, latency can be reduced by reducing the number of levels of the search tree. To this end, embodiments discussed herein use different ranges for searches in each level allowing for smaller ranges where applicable policies are more dense, and larger ranges where applicable policies are more sparse. Such matching of ranges requires a more complexity in creating the search tree, but the resulting search tree (i.e., the non-equal boundary policy set search tree) can exhibit reduced depth and thus lower latency when compared to search trees that have equal boundaries.

In some embodiments, a policy set is provided and includes a number of policies which may be thousands or more policies that are to be selectively applied to received network traffic. The non-equal boundary policy set search tree is created by first associating the entire policy set with an initial node (i.e., the root node) in the search tree. Where this node has more than a defined number of policies associated with it, it is divided into child nodes each representing a respective subset of the policy set. The division into child nodes incudes selecting a dimension of the policy set. Such a dimension may be any attribute of a received network packet including, but not limited to, a source address, a destination address, a source port number, a destination port number, protocol, or the like.

A partition number is then determined for the dimension. This partition number is the number of child nodes (i.e., distinct ranges of the selected dimension) that will be created under the parent node. In some embodiments the resulting non-equal boundary policy set search tree is deployed in a policy matching circuit that includes a finite number of comparators that can be programmed to compare a received network packet with a number of distinct ranges of the dimension in a single parallel process. In such an embodiment, the upper limit of the partition number can be set to the number of available comparators in the policy matching circuit, but may be chosen to be a smaller number.

The policy set of the parent node is split or cut into a number of subsets, where the number of subsets corresponds to the partition number. The subsets are divided with a view of creating the fewest number of levels in the resulting non-equal boundary policy set search tree, and as such the divisions are generally made with smaller ranges of the search dimension where policies are more densely packed, and larger ranges of the search dimension where policies are more sparsely packed. Once a child node represents fewer than a defined number of distinct policies, then it is identified as a leaf node. A received network packet that matches a leaf node will have all of the policies associated with the leaf node applied to the received network packet. In some embodiments, the policies associated with the leaf node are applied to the received network packet, one by one, until one match is found, or not match is found for all the policies associated with the leaf node. In some embodiments, the defined number of distinct policies is eight (8). In some cases this number can be user programmable.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided, at least in part, as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance, network element, or network device may include and/or operate as a network processor. In some cases, network appliance, network element, or network device may be a network router, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Yet other devices may include a general-purpose computer coupled to custom hardware. Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTI-MAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBAL-ANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), virtual or physical sandboxing appliances (e.g., FORTISANDBOX family of security appliances), and DOS attack detection appliances (e.g., the FORTIDDOS family of DOS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for selectively applying policies to network traffic. The methods include: accessing, by a first processing system, a policy set; generating, by the first processing device, a non-equal boundary policy set search tree for the policy set; receiving, by a second processing system, a network packet; searching, by the second processing system, for a leaf node in the non-equal boundary policy set search tree that matches the network packet, where the leaf node is associated with at least one policy of the policy set; applying, by the second processing system, the at least one policy of the policy set to the network packet to yield a processed network packet; and forwarding, by the second processing system, the processed network packet. The non-equal boundary policy set search tree includes at least a first node and a second node, where: the first node is a first subset of the policy set to be applied over a first range, the second node is a second subset of the policy set to be applied over a second range, and the first range is not equal to the second range.

In various instances of the aforementioned embodiments, the policy set includes at least a first policy and a second policy, where the first policy is applicable to network traffic occurring within a first range set and the second policy is applicable to network traffic occurring within a second range set, and the first range set and the second range set are not mutually exclusive and are each within an overall range of the policy set.

In some instances of the aforementioned embodiments, the first processing system and the second processing system are the same network appliance. In various instances of the aforementioned embodiments where second processing system is a network appliance that includes both a general purpose processor and a policy matching circuit, at least part of searching for the leaf node in the non-equal boundary policy set search tree is done by the policy matching circuit.

In various instances of the aforementioned embodiments, the first node is a leaf node of the non-equal boundary policy set search tree when the first node designates less than a defined number of policies in the policy set. In some such embodiments, the defined number of policies in the policy set is user programmable.

In some instances of the aforementioned embodiments, the generating the non-equal boundary policy set search tree for the policy set includes: identifying, by the first processing system, items in the policy set, where each of the items in the policy set is a single boundary of a range to which a respective policy of the policy set is to be applied; and identifying, by the first processing system, a division point in a range extending over the policy set that yields the first range including a first number of the items in the policy set and the second range including as second number of the items in the policy set. The first number and the second number are approximately the same number of items. In some such embodiments, the generating the non-equal boundary policy set search tree for the policy set further includes: determining, by the first processing system, a partition number for the policy set that reduces replication of policies across different leaf nodes in the non-equal boundary policy set search tree; and performing, by the first processing system, an even partition of the policy set when the partition number for the policy set is larger than a defined value. Performing the even partition of the policy set results in changing the first range to equal the second range. In various cases the determining the partition number includes: calculating, by the first processing system, a first replica ratio function value for a first partition number applied to the policy set and a second replica ratio function value for a second partition number applied to the policy set; and selecting, by the first processing system, a partition number as the first partition number where the first replica ratio function value is less than the second replica ratio function value. In various cases the defined value is a first defined value, and determining the partition number includes re-weighting, by the first processing system, the second replica ratio function value when the number of items is less than a second defined value. The re-weighting the second replica ratio function value includes multiplying the first replica ratio function value by log (number of items)/Log (threshold value). In some such cases, the second defined value and the threshold value are user programmable.

Other embodiments provide methods for generating an efficient policy search tree. The methods include: accessing, by a processor, a policy set; identifying, by the processor, items in the policy set, where each of the items in the policy set is a single boundary of a range to which a respective policy of the policy set is to be applied; identifying, by the processor, a division point in a range extending over the policy set that yields the first range including a first number of the items in the policy set and the second range including as second number of the items in the policy set, and where the first number and the second number are approximately the same number of items; and generating, by the processor, a non-equal boundary policy set search tree for the policy set, wherein the non-equal boundary policy set search tree includes at least a first node and a second node, wherein the first node is a first subset of the policy set to be applied over a first range, wherein the second node is a second subset of the policy set to be applied over a second range.

In some instances of the aforementioned embodiments, the method further includes configuring, by a network appliance, a processing resource of the network appliance to identify a subset of policies to be applied to a received network traffic based upon the non-equal boundary policy set search tree. In some such instances, the processing resource of the network appliance includes both a general purpose processing and a policy matching circuit.

In various instances of the aforementioned embodiments, the methods further include: determining, by the processor, a partition number for the policy set that reduces replication of policies across different leaf nodes in the non-equal boundary policy set search tree; and performing, by the processor, an even partition of the policy set when the partition number for the policy set is larger than a defined value, where performing the even partition of the policy set results in the first range being equal the second range.

In other instances of the aforementioned embodiments, the methods further include: determining, by the processor, a partition number for the policy set that reduces replication of policies across different leaf nodes in the non-equal boundary policy set search tree; and performing, by the processor, a binary partition of the policy set at the division point when the partition number for the policy set is equal to a defined value, wherein performing the binary partition of the policy set results the first range being different from the second range and the first node. In some such instances, the determining the partition number includes: calculating, by the processor, a first replica ratio function value for a first partition number applied to the policy set and a second replica ratio function value for a second partition number applied to the policy set; and selecting, by the processor, a partition number as the first partition number where the first replica ratio function value is less than the second replica ratio function value. In some cases where the defined value is a first defined value, and the determining the partition number further includes: re-weighting, by the processor, the second replica ratio function value when the number of items is less than a second defined value. Such re- weighting the second replica ratio function value may include multiplying the first replica ratio function value by log (number of items)/Log (threshold value).

In various instances of the aforementioned embodiments, the policy set includes at least a first policy and a second policy, where the first policy is applicable to network traffic occurring within a first range set and the second policy is applicable to network traffic occurring within a second range set, and the first range set and the second range set are not mutually exclusive and are each within an overall range of the policy set.

Yet other embodiments provide systems for selectively applying policies to network traffic. The systems include a first processing system communicably including a first non-transitory computer readable medium and a second processing system communicably including a second non-transitory computer readable medium. The first non-transitory computer readable medium has stored therein instructions that when executed by the first processing system cause the first processing system to: access a policy set; and generate a non-equal boundary policy set search tree for the policy set, where the non-equal boundary policy set search tree includes at least a first node and a second node, the first node is a first subset of the policy set to be applied over a first range, the second node is a second subset of the policy set to be applied over a second range, and the first range is not equal to the second range. The second non-transitory computer readable medium has stored therein instructions that when executed by the second processing system cause the second processing system to: receive a network packet; search for a leaf node in the non-equal boundary policy set search tree that matches the network packet, where the leaf node is associated with at least one policy of the policy set; apply the at least one policy of the policy set to the network packet to yield a processed network packet; and forward the processed network packet.

Turning to FIG. 1A, network architecture 100 is shown that includes network appliance 110 including efficient policy application hardware and executing a policy cutting application 113 and a policy processing application 112 in accordance with some embodiments. Policy cutting application 113 relies upon a network policy set 111 that is defined for network traffic traversing network appliance 110. In some embodiments, the network policy set is defined by a network administrator and identifies policies that are to be applied selectively to different types of network traffic. As an example, the network policy set may indicate that a first policy is to be applied to all traffic having a source address in a range of A to B and a destination address in a range from C to D. Based upon the disclosure provided herein, one of ordinary skill in the art will recognize a variety of different policies and criteria for selecting which network traffic to which the respective policies are to be applied. The network policy set may include any number of policies with some embodiments having ten thousand policies or more.

In the context of network architecture 100, a number of network elements (e.g., a network element 116a, a network element 116b, a network element 116c, a network element 116d, a network element 126a, a network element 126b, and a network element 126c) are coupled to respective networks (e.g., a local network 114 and a communication network 105). Local network 114 and communication network 105 may respectively be any type of communication network known in the art. Those skilled in the art will appreciate that, local network 114 and/or communication network 105 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network appliance 110. Network appliance 110 that selectively applies one or more policies from network policy set 111 to a network packet traversing network appliance 110. Selection of which policy will be applied is based upon a search of a non-equal boundary policy set search tree using one or more dimensions of the network packet. Policy cutting application 113 when executed by network appliance 110 is applied to network policy set 111 to generate the non-equal boundary policy set search tree. Once a match of the network packet to a leaf of the non-equal boundary policy set search tree is identified, one or more policies associated with the leaf are applied by policy processing application 112 executing on network appliance 110 to the network packet.

As mentioned above, the non-equal boundary policy set search tree is configured to reduce the number of search levels required to identify applicable policies by allowing different search ranges within a given level of a search tree. These differences in search ranges result in the aforementioned non-equal boundary policy set search tree. This is in direct comparison to an equal boundary policy set search tree where the search ranges within a given level of a search tree are required to be the same. In some embodiments the non-equal boundary policy set search tree is deployed in a policy matching circuit that is included as part of network appliance.

Figure 1B:
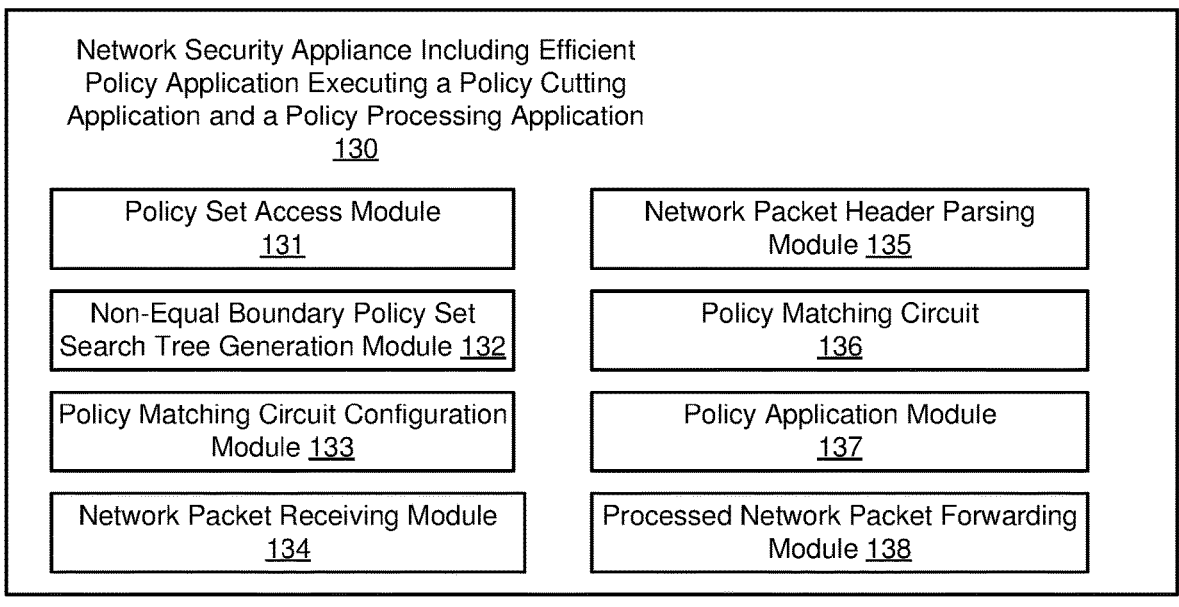

Turning to FIG. 1B, an example implementation of a network appliance executing a policy cutting application and a policy processing application 130 (e.g., network appliance 110 executing policy cutting application 113 and policy processing application 112) is shown in accordance with some embodiments. As shown in this example, network appliance executing a policy cutting application and a policy processing application 130 includes: a policy set access module 131, a non-equal boundary policy set search tree generation module 132, a policy matching circuit configuration module 133, a network packet receiving module 134, a network packet parsing module 135, a policy matching circuit 136, a policy application module 137, and a processed network packet forwarding module 138.

Policy set access module 131 is configured to access a policy set from a defined location in a computer readable medium. Such a policy set includes at least a first policy and a second policy. The first policy is applicable to network traffic occurring within a first range set and the second policy is applicable to network traffic occurring within a second range set. The first range set and the second range set are each within an overall range of the policy set. In some cases, the first range set and the second range set are not mutually exclusive and are each within an overall range of the policy set.

Non-equal boundary policy set search tree generation module 132 is configured to generate a non-equal boundary policy set search tree. Such generation may be done similar to that described below in relation to FIGS. 3-4.

Network packet receiving module 134 is configured to receive a network packet traversing a communication network including traversing the network appliance. Network packet parsing module 135 is configured to parse a header of a received network packet to gather data for search fields in a non-equal boundary policy set search tree applied by the network appliance. This parsed information may include, but is not limited to, source IP address, destination IP address, protocol, source port, and/or destination port. Policy matching circuit 136 is configured to apply the non-equal boundary policy set search tree the information from packet parsing module 135 to identify one or more policies from the policy set that are to be applied to the network packet. Policy application module 137 is configured to apply the identified one or more policies from the policy set to the network packet to yield a processed network packet, and processed network packet forwarding module 138 is configured to forward the processed network packet to a destination address.

Figure 1C:
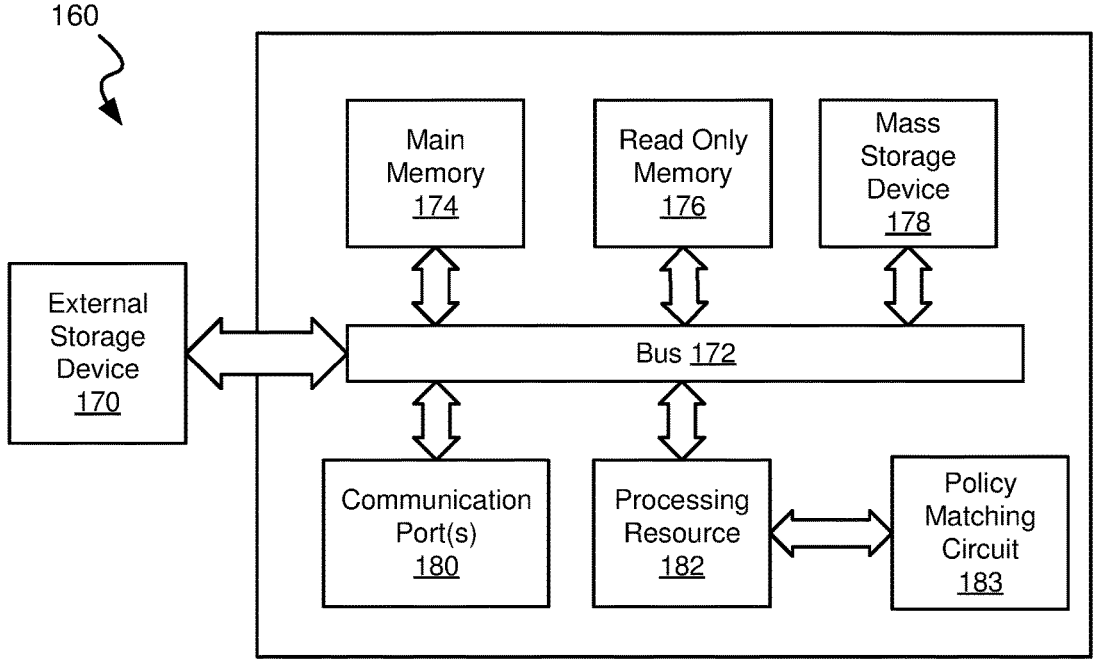

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure. Processor 182 may communicate with a policy matching circuit 183. Policy matching circuit 183 includes a number of comparators that can be configured to apply a received network packet to a non-equal boundary policy set search tree to identify one or more policies from a network policy set that are to be applied to the network packet.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
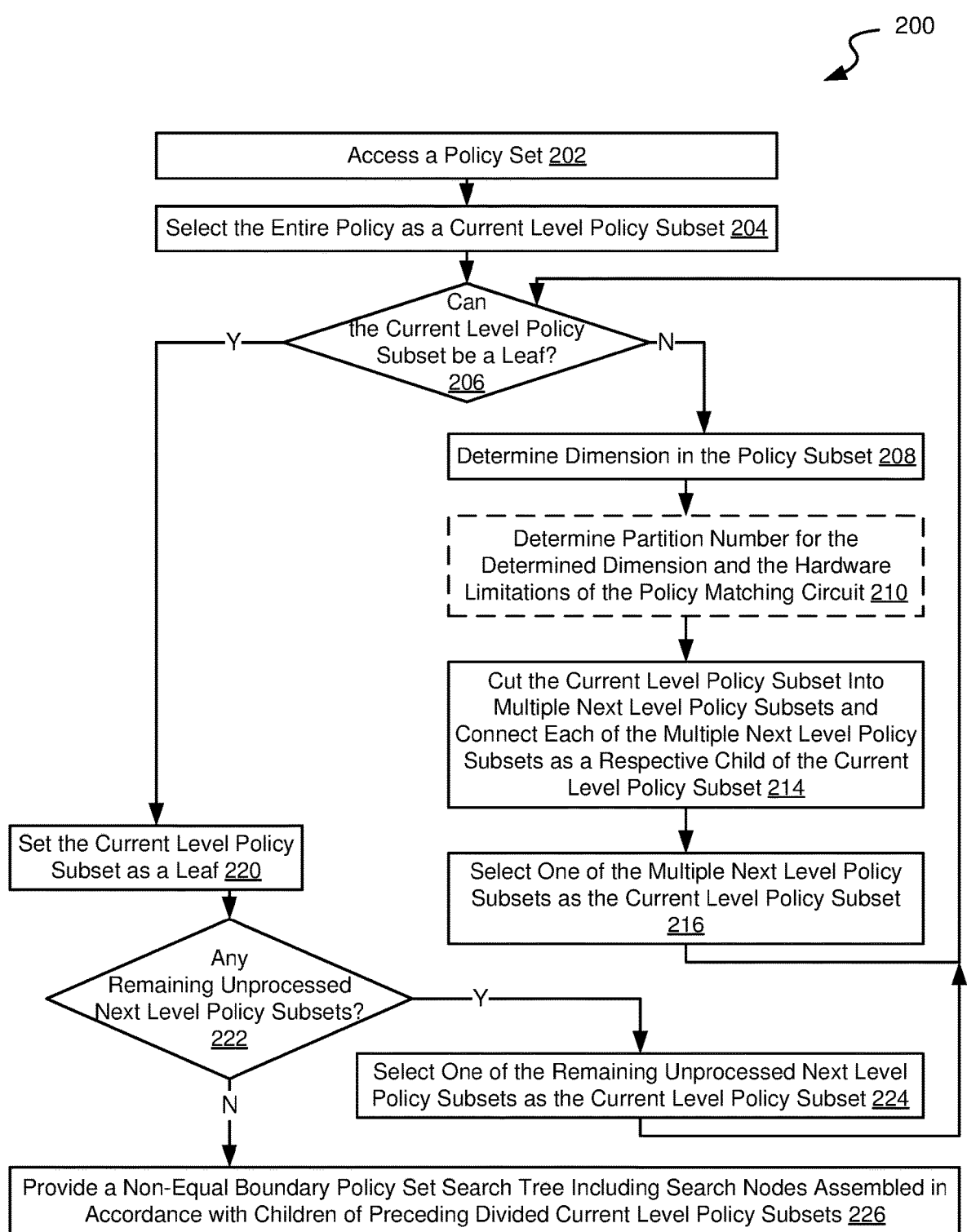
Figure 4:
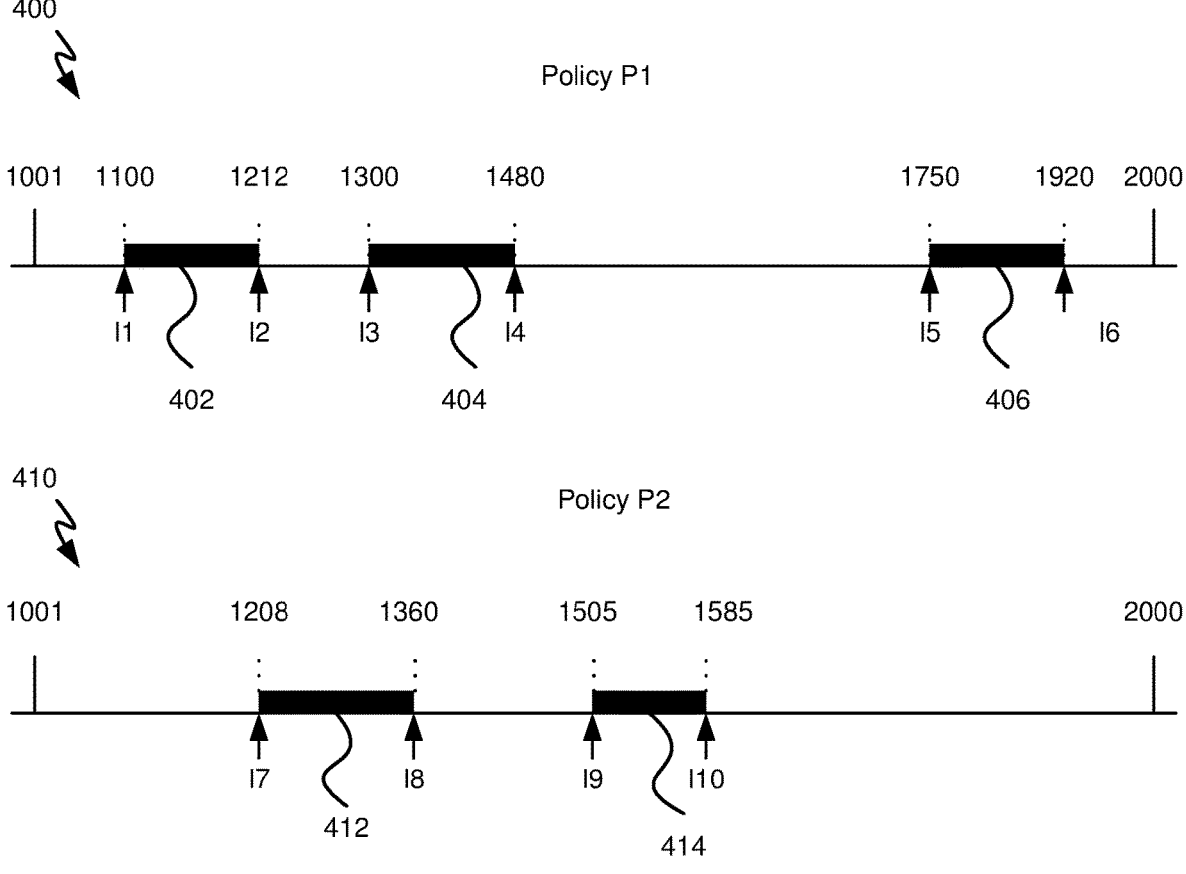

Turning to FIGS. 2-4, a method embodied in a policy cutting application is shown in accordance with some embodiments. Turning to FIG. 2 and following flow diagram 200, a policy set is accessed (block 202). This may be done, for example, by accessing a memory that stores the policy set. The accessed memory may be directly coupled to a device performing the processes of FIG. 2 or to, for example, a network server that is communicably coupled to the device performing the processes of FIG. 2. In some embodiments, the policy set is created by a network administrator and includes a number of policies that are to be selectively applied to received network traffic. The policy set may include any number of policies with some embodiments having thousands or more policies.

The entire policy set is selected as a current level policy subset (block 204). It is determined whether the number of distinct policies in the current level policy subset exceeds a defined threshold (block 206). In some cases, the defined threshold is eight (8) and defines a maximum number of policies that will be applied to any given network packet. In some embodiments, the defined threshold is user programmable. One of ordinary skill in the art will recognize different limits on the number of policies that can be applied to a network packet that may be used in relation to different embodiments.

Where the number of distinct policies in the current level policy subset does exceeds the defined threshold (block 206), then the current level policy subset is cut into two or more next level policy subsets each covering a reduced number of distinct policies. To do this, a dimension along which the current level policy subset is to be divided is determined (block 210). Such a dimension may be any attribute of a received network packet including, but not limited to, a source address, a destination address, a port number, or the like. A dimension is selected that allows for separating the current level policy subset into a number of next level policy subsets. In some embodiments where a resulting non-equal boundary policy set search tree is to be deployed in a policy matching circuit having a defined number of configurable comparators, a dimension is selected that allows for creation of the same defined number of next level policy subsets with each of the next level policy subsets having distinct groups of policies. Based upon the disclosure provided herein, one of ordinary skill in the art will recognize a variety of basis for selecting a dimension.

A partition number for the determined dimension is determined based in part on a combination of the limitations of a policy matching circuit, where applicable (block 210). Block 210 is shown in dashed lines as one embodiment of this process is discussed below in relation to FIG. 3. Turing to FIG. 3, a flow diagram 300 shows a method in accordance with some inventions for determining a partition number for a current level policy subset. Following flow diagram 300, a next partition number is initialized as two (2), and a prior replica ratio function value is set equal to a maximum (block 302). A replica ratio function (RRF) is a measurement of the degree that policies are replicated due cutting or dividing a current level policy subset. Policies can be applied to multiple ranges across a dimension, and thus can extend across multiple child nodes depending upon where along the dimension the current level policy subset is cut. In such a cases, the policy will be replicated multiple times-once in each of the child node to which it applies.

A general equation for the replica ratio function is:

$$\text{Relpica Ratio Function} = (\text{items})^{\wedge}k/PNR,$$

where PNR is the partition number (i.e., the number of partitions to be created in the current level policy subset), k is set equal to a value greater than 1.0 (for this embodiment k is set equal to 2.0), and "items" corresponds to a policy count (polcnt), the replica ratio function is:

$$\text{Replica Ratio Function} = (polcnt)^{\wedge}2/PNR.$$

This example formula for the replica ratio function yields dramatically different results depending upon the overlap of policies across child nodes, and thus provides a good measure of which partition number yields the least amount of policy replication.

Applying the preceding formula to an example scenario of one hundred (100) distinct policies within the current level policy subset where none of the policies cross multiple nodes, the following value results:

$$\text{Replica Ratio Function} = (100 * 100)/PNR.$$

When PNR=2 (i.e., the current level policy subset is divided or partitioned into two (2) child nodes), the replica ratio function value is 5000 (i.e., RRF=(100*100)/2=5000). Alternatively, when PNR=10 (i.e., the current level policy subset is divided or partitioned into ten (10) child nodes), the replica ratio function value is 1000 (i.e., RRF=(100*100)/10=1000). As the smaller replica ratio function value results in less replication of policies across child nodes (i.e., each child node covers fewer distinct policies after the division), the partition number of ten (10) in this case would be chosen (i.e., 1000 is less than 5000). As mentioned above, once a node covers a defined maximum of policies it is identified as a leaf, or the end of the search tree.

As another example where the same one hundred (100) distinct policies within the current level policy subset each cross half of the child nodes because they each have wide ranges in the dimension, a different result occurs. In particular, the value of polent is calculated as:

$$polcnt = (100 * PNR)/2 (\text{i.e., every policy is replicated } PNR/2 \text{ times}).$$

Using this calculated value of polent in the situation where PNR=2 (i.e., the current level policy subset is divided or partitioned into two (2) child nodes), the replica ratio function value is 5000 (i.e., RRF=(100*100)/2=5000). Alternatively, when PNR=10 (i.e., the current level policy subset is divided or partitioned into ten (10) child nodes), the replica ratio function value is 25000 (i.e., RRF=[(10*100/2)^2]/10=25000). Again, the smaller replica ratio function value results in less replication of policies across child nodes (i.e., each child node covers fewer distinct policies after the division), the partition number of two (2) in this case would be chosen (i.e., 5000 is less than 25000). As mentioned above, once a node covers a defined maximum of policies it is identified as a leaf, or the end of the search tree.

The current level policy subset is cut or divided using the next partition number such that each of the resulting partitions has approximately the same number of items (block 304). As used herein, the phrase "approximately the same number of items" means that the number of items in each of the each of the resulting partitions is within one (1) of each of the other partitions. Thus, for example, where there are three (3) items and one of the partitions incudes two (2) items and the other of the partitions includes one (1) item, the partitions are considered to have approximately the same number of items. As another example, where there are four (4) items and each of two partitions includes two (2) items, the partitions are considered to have approximately the same number of items.

As used herein, an "item" is defined as a single boundary value. Thus, for example, where a policy applies to a single continuous range of a dimension, it would have two (2) items-one for the beginning boundary of the range and the other for the ending boundary of the range. Where, as another example, a policy applies to multiple non-contiguous ranges of a dimension, the policy would have many items each associated with either a beginning boundary or an ending boundary of each of the multiple non-contiguous ranges of the dimension. Turning to FIG. 4, a graphic 400 shows a policy P1 with three (3) non-contiguous ranges of a dimension extending over a range from 1001 to 2000 (i.e., a range 402 extending from 1100 to 1212, a range 404 extending from 1300 to 1480, and a range 406 extending from 1750 to 1920). In this example, policy P1 includes six (6) items (i.e., an item I1 of 1100, an item I2 of 1212, an item I3 of 1300, an item I4 of 1480, an item I5 of 1750, and an item I6 of 1920). A graphic 410 shows another policy P2 with two (2) non-contiguous ranges of the same dimension extending over the same range from 1001 to 2000 (i.e., a range 412 extending from 1208 to 1360, and a range 414 extending from 1505 to 1585). In this example, policy P2 includes four (4) items (i.e., an item I7 of 1208, an item I8 of 1360, an item I9 of 1505, and an item I10 of 1585). It is noted that policy P1 and policy P2 are merely examples and that one of ordinary skill in the art will recognize that a large number of policies extending over a variety of contiguous and non-contiguous ranges can be described similarly as a group of items.

Using FIG. 4A as an example where policy P1 has six (6) items and policy P2 has four (4) items, dividing the current level policy subset into, for example, two (2) partitions would result in each of the two partitions having five (5) items with a dividing line somewhere between 1360 and 1480 as more fully described below. As another example where the same dimension is divided into four (4) partitions, the first two of the four partitions would have three (3) items and the last two of the four partitions would have four (2) items with a first dividing line somewhere between 1212 and 1300, a second dividing line somewhere between 1480 and 1505, and a third dividing line somewhere between 1585 and 1750.

With the current level policy subset cut or divided into partitions (block 304), a current replica ratio function value is calculated for the next partition number (block 306). It is then determined whether the recently calculated current replica ratio function value is less than the prior replica ratio function value (block 308). Where the recently calculated current replica ratio function value is less than the prior replica ratio function value is less (block 308), the next partition number is set as the determined partition number (i.e., the best partition number to this point), and the prior replica ratio function value is set equal to the recently calculated current replica ratio function value (block 312).

The process continues by increasing the next partition number (block 312). It is then determined whether the next partition number exceeds a maximum value (block 314). The maximum value may be user programmable. In some embodiments using a policy matching circuit that includes a defined number of comparators that can be programmed to compare a received network packet with a number of distinct ranges of a dimension, the maximum may be set to the defined number of comparators. Based upon the disclosure provided herein, one of ordinary skill in the art will recognize a variety of maximum values for the next partition number that may be used in relation to different embodiments.

Where the next partition number does not exceed the maximum value (block 314), the processes beginning at block 304 are repeated for the recently updated next partition number. This continues until the desired partition numbers have been processed (i.e., the incremented next partition number exceeds the maximum) (block 314), at which time the determined partition number is returned (block 316). The determined partition number is that which yielded the lowest value for the replica ratio function.

In some embodiments, only partition numbers from a defined list of partition numbers are tested. For example, it has been found that binary cuts almost always outperform even cuts for low partition numbers (e.g., 2 or 3), even though these low partition numbers can occasionally produce smaller replica ratio function values. To avoid this, one strategy would be to skip lower partition numbers (e.g., skip all partition numbers less than sixteen (16)). Such an approach would lead to more efficient non-equal boundary policy set search trees. In one particular embodiment where the maximum number of partitions is thirty-two (32) because of limitations of a policy matching circuit, only the following list of partition numbers is considered: 2, 16, 20, 24, 28, 32.

Returning to FIG. 2, the current level policy subset is cut or divided into multiple next level policy subsets, and each of the multiple next level policy subsets is identified as a child node of the current level policy subset (block 214). The dimension range for each of the next level policy subsets is selected such that each of the next level policy subsets has approximately the same number of items within the range. As discussed above, an item is a single boundary value. Thus, assuming the partition number returned from block 210 is two (2) and using the simple example of FIG. 4 where there are two (2) policies (i.e., policy P1 and policy P2) that together account for ten (10) items, a first next level policy subset will include five (5) items and a second next level policy subset will include five (5) items.

Any approach known in the art for dividing a dimension into a defined number of next level policy subsets each having approximately the same number of items may be used in relation to different embodiments. In particular embodiments the division process always halves (i.e., makes binary cuts) the number of items at each level resulting in the maximum number of levels of a resulting non-equal boundary policy set search tree being bounded by log 2 of the total number of items across the dimension. In such embodiments, for worst case scenarios that are challenging for prior art approaches using only equal boundaries, applying binary cuts still results in a reasonable search efficiency from the resulting non-equal boundary policy set search tree. In such embodiments the division point between adjoining next level policy subsets is selected according to the following pseudocode:

```
//Pass start boundary and the end boundary for two combined next level policy subsets //
//e.g., minimum=1001 and maximum=2000 in FIG. 4A with a partition number of two (2) //
BinaryDividerPoint(minimum, maximum)
{
    low = minimum
    high = maximum
```

-continued

```
while(low < high){
    mid = (low+high)/2
    //count items in each of the next level policy subsets if division point is mid//
    CountItems(minimum, maximum, mid)
    If(items in Next Level Policy Subset 2 > items in Next Level Policy Subset 1){
        high = mid
    }
    Else{
        Low = mid+1
    }
}
    return high
}
```

Using the pseudocode above applied to the simple two policy scenario (i.e., policy P1 and policy P2) of FIG. 4, the returned division point would be 1375. The run time required to divide using the above mentioned pseudocode is defined by the following equation:

$$\text{Run time} = (\text{items}) * \log(\text{maximum} - \text{minimum}).$$

Once the current level policy set has been partitioned into multiple next level policy sets (block 214), one the multiple next level policy sets is selected for further processing (block 216). In embodiments where the multiple next level policy sets include two (2) next level policy sets, then one of the two is selected for further processing. The selected next level policy set is set as the current level policy set and processing of the newly set current level policy set begins at block 206.

Where the number of distinct policies in the current level policy subset does not exceed the defined threshold (block 206), the current level policy subset is set as a leaf node (block 220). The policies in the current level policy subset will all be applied to any network traffic that matches the leaf node. It is then determined whether any unprocessed next level policy subsets remain to be processed (block 222). Where more remain to be processed (block 222), one of the remaining unprocessed next level policy subsets is selected as the current level policy subset (block 224) and processing continues at block 206 for the newly selected current level policy subset. As will be appreciated, the process is recursively applied until every next level policy set is either partitioned into more next level policy sets or is identified as a leaf node.

Where no next level policy subsets remain to be processed (block 222), all of the child nodes and leaf nodes are assembled into a non-equal boundary policy set search tree (block 226). This non-equal boundary policy set search tree can then be used in real time to identify one or more policies from a policy set that are to be applied to network traffic being processed by a network appliance.

In some embodiments where the total number of policies is small, a reweighting schema can be applied as follows. First, when the item count of the current level policy set is under a certain threshold (i.e., THRESHOLD) the prior replica ratio function (PRRF) (see FIG. 3) is modified in accordance with the following equation:

$$\text{replica ratio function value} = \left[\log(\text{items})/\log(\text{THRESHOLD})\right] * PRRF.$$

Therefore, the smaller the policy count (at the deeper levels of the tree), the more likely it will be that binary cuts will be used, while the even cuts will be primarily used at the beginning, dividing initial nodes using large partition numbers to quickly separate policies to the child nodes. In one embodiment, when the policy count is no greater than four hundred (400) at the current level policy set, we set THRESHOLD to 400 to nudge the schema to use binary cuts rather than even cuts on a higher partition number.

Figure 5A:
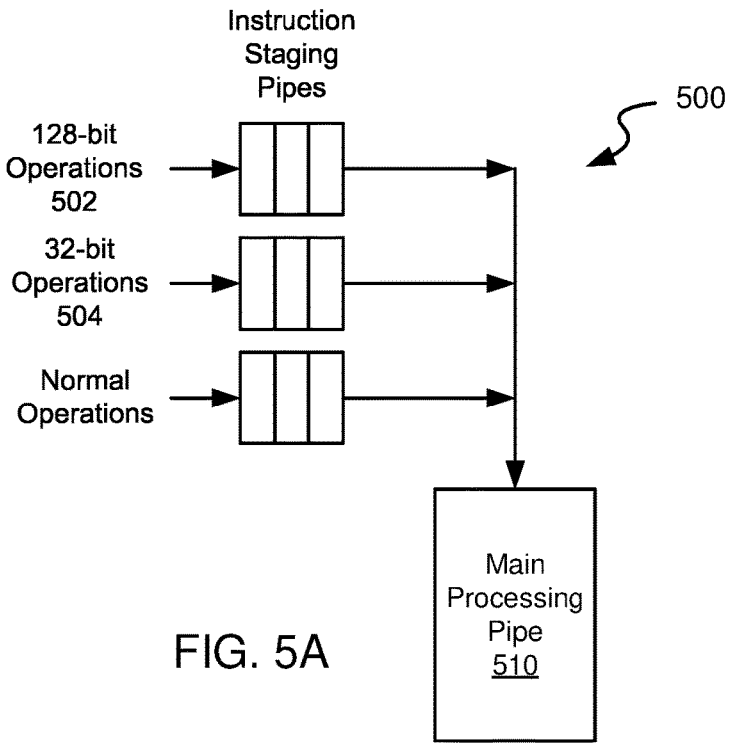
FIGS. 5A-5C illustrate example processing hardware usable in relation to different embodiments.
Figure 5B:
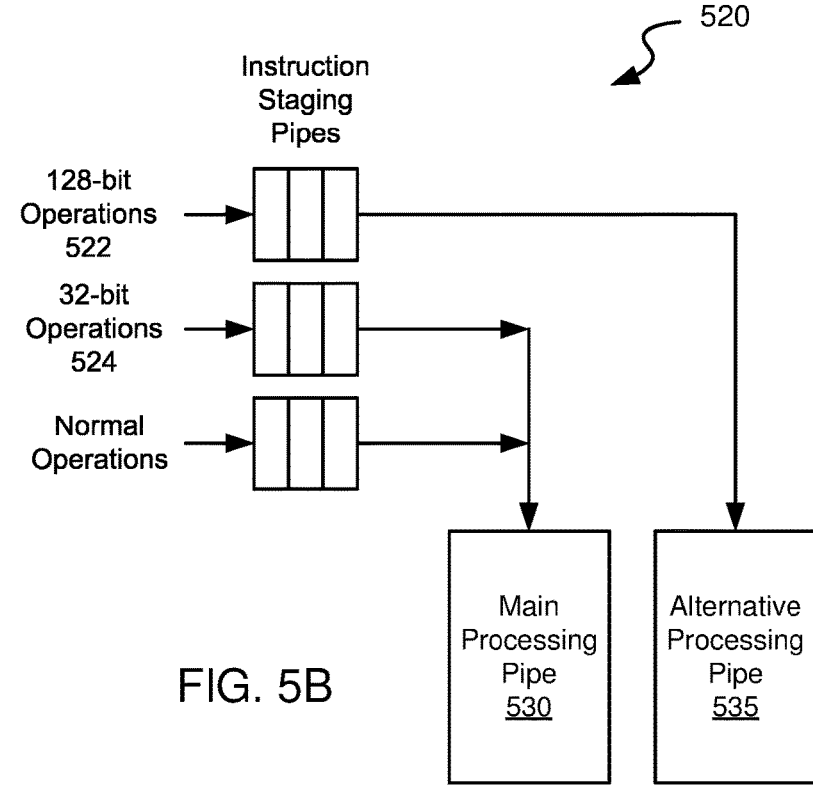
Figure 5C:
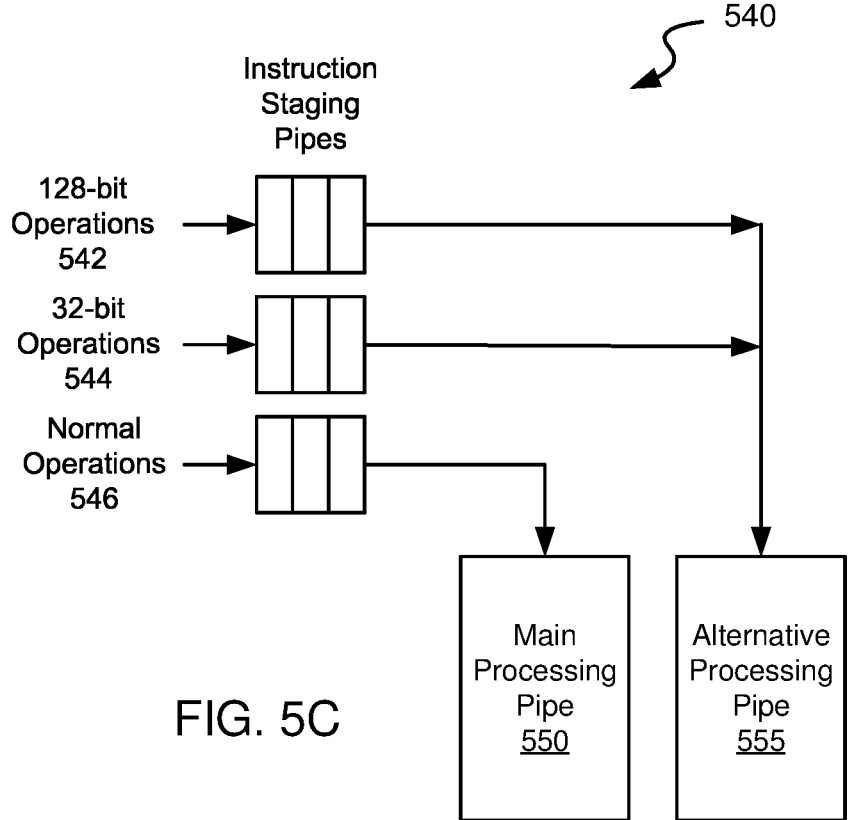

When searching through a tree built with Binary-Cut Gentree, the hardware only needs the boundary and splitting point as parameters at a node where a partition number of two (2) is chosen, which is the same amount of information needed at an original Gentree node (the boundary and the even cut value, i.e., stride, which is derived from the boundary width and partition number), so the hardware for policy matching requires minimal change or no change. Selections of embodiments for hardware that supports Binary Cuts are illustrated in FIGS. 5A-5C. Turning to FIG. 5A, in one embodiment both 32-bit valued (32-bit operations 504) and 128-bit valued (128-bit operations 502) Binary Cuts are implemented using general-purpose instructions in a general-purpose processor's main processing pipe 510. Turning to FIG. 5B, in another embodiment of 32-bit valued (32-bit operations 524), Binary Cuts are implemented using general-purpose instructions in a general-purpose processor's main processing pipe 530. In contrast, 128-bit valued (128-bit operations 522) Binary Cuts are implemented in an alternative processing pipe 535 implemented in a policy matching circuit. Turning to FIG. 5C, in yet another embodiment both 32-bit valued (32-bit operations 504) and 128-bit valued (128-bit operations 502) Binary Cuts are implemented in an alternative processing pipe 555 separate from a general-purpose processor's main processing pipe 550. The aforementioned alternative processing pipes perform the Binary Cuts and the even cuts of higher partition numbers, on top of the pointer chasing operation, until it reaches a leaf node. The respective alternative processing pipe can have its own cache or share the cache with the processor's cache system.

Figure 6:
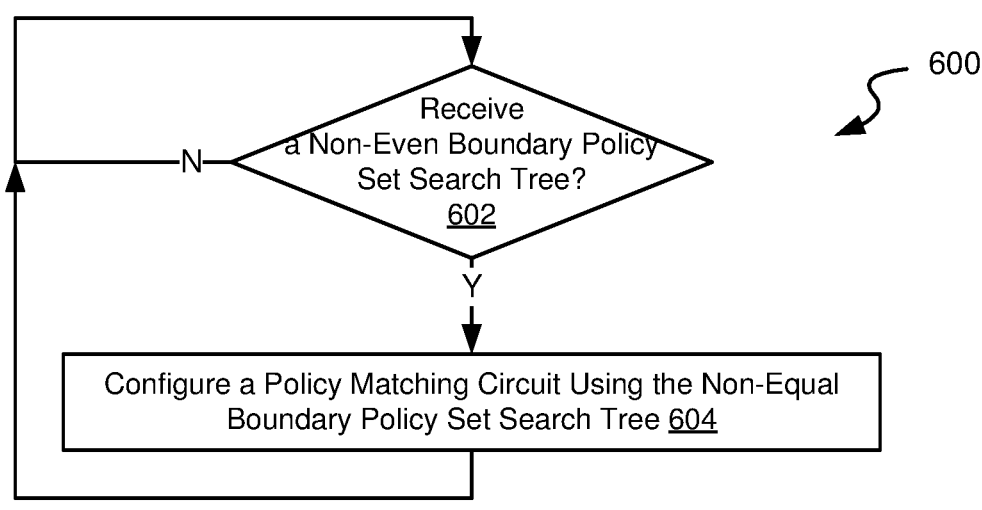
FIG. 6 is a flow diagram showing a method in accordance with some embodiments for configuring a policy matching circuit.

Turning to FIG. 6, a flow diagram 600 shows a method in accordance with some embodiments for configuring a policy matching circuit. Following flow diagram 600, it is determined if an updated non-even boundary policy set search tree has been received (block 602). Such an updated non-even boundary policy set search tree may be received, for example, from a third party that generated it from a policy set or from a local processor that generated it from a policy set. Where an updated non-even boundary policy set search tree has been received (block 602), it is used to configure a policy matching circuit to perform matching between received network traffic and policies in the policy set (block 604).

Figure 7:
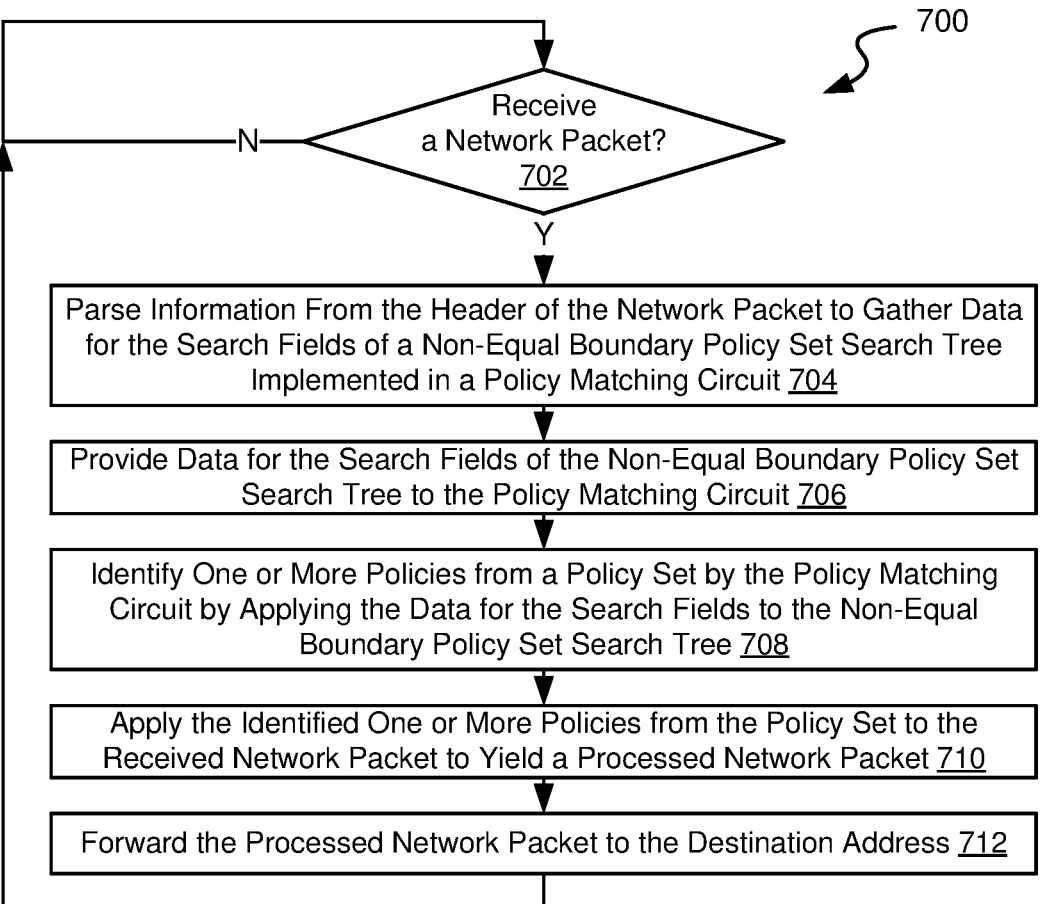
FIG. 7 is a flow diagram showing a method in accordance with various embodiments for processing received network packets including applying policies to the received network packets that are identified using a non-equal boundary policy set search tree.

Turning to FIG. 7, a flow diagram 700 shows a method in accordance with various embodiments for processing received network packets including applying policies to the received network packets that are identified using a non-equal boundary policy set search tree. Following flow diagram 700, it is determined whether a network packet has been received by a network appliance (block 702). Where a network packet has been received (block 702), information in the header of the network packet is parsed to gather data for search fields in a non-equal boundary policy set search tree applied by the network appliance (block 704). This parsed information may include, but is not limited to, source IP address, destination IP address, protocol, source port, and/or destination port.

The parsed information is provided to search fields of the non-equal boundary policy set search tree (block 706). In some embodiments, the non-equal boundary policy set search tree is implemented in a general purpose processor. In other embodiments, the non-equal boundary policy set search tree is implemented in a policy matching circuit. In yet other embodiments, the non-equal boundary policy set search tree is implemented in a combination of a general purpose processor and a policy matching circuit. For the embodiment discussed in relation to FIG. 7, it is assumed that the non-equal boundary policy set search tree is implemented in a policy matching circuit.

A search of the parsed information using the non-equal boundary policy set search tree is performed to identify one or more policies applicable to the network packet. Such policies are those associated with a leaf in the non-equal boundary policy set search tree. Thus, once the search moves through level of the non-equal boundary policy set search tree arriving at a leaf, the one or more policies associated with the leaf are accessed and applied to the received network packet (block 710). Based upon the disclosure provided herein, one of ordinary skill in the art will recognize a variety of policies that may be applied in accordance with different embodiments. After application of the identified policies (block 710), the processed network packet is forwarded to a destination address (block 712).

In conclusion, the present disclosure provides for novel systems, devices, and methods. While detailed descriptions of one or more embodiments have been given above, various alternatives, modifications, and equivalents will be apparent to those skilled in the art without varying from the spirit of the claims. Therefore, the above description should not be taken as limiting the scope of the inventions, which are defined by the appended claims.

What is claimed is:

1. A method for selectively applying policies to network traffic, the method comprising:

accessing, by a first processing system, a policy set;

generating, by the first processing system, a non-equal boundary policy set search tree for the policy set, wherein the non-equal boundary policy set search tree includes at least a first node and a second node, wherein the first node is a first subset of the policy set to be applied over a first range, wherein the second node is a second subset of the policy set to be applied over a second range, and wherein the first range is not equal to the second range, wherein said generating includes:

identifying items in the policy set in which each of the items in the policy set is a single boundary of a range to which a respective policy of the policy set is to be applied;

identifying a division point in the range that yields the first range, including a first number of the items in the policy set, and the second range, including a second number of the items in the policy set;

performing, partitioning of the policy set at the division point that reduces a number of levels of the non-equal boundary policy set search tree by:

using an even partitioning of the policy set when a partition number for the policy set is larger than a defined value, wherein performing the even partition of the policy set results in changing the first range to equal the second range; and using a binary partitioning of the policy set when the partition number for the policy set is equal to the defined value;

receiving, by a second processing system, a network packet;

searching, by the second processing system, for a leaf node in the non-equal boundary policy set search tree that matches the network packet, wherein the leaf node is associated with at least one policy of the policy set;

applying, by the second processing system, the at least one policy of the policy set to the network packet to yield a processed network packet; and forwarding, by the second processing system, the processed network packet.

2. The method of claim 1, wherein the first processing system and the second processing system are the same network appliance.

3. The method of claim 1, wherein the second processing system is a network appliance that includes both a general purpose processor and a policy matching circuit, and wherein at least part of searching for the leaf node in the non-equal boundary policy set search tree is done by the policy matching circuit.

4. The method of claim 1, wherein the first node is a leaf node of the non-equal boundary policy set search tree when the first node designates less than a defined number of policies in the policy set.

5. The method of claim 4, wherein the defined number of policies in the policy set is user programmable.

6. The method of claim 1, wherein the determining the partition number comprises:

calculating, by the first processing system, a first replica ratio function value for a first partition number applied to the policy set and a second replica ratio function value for a second partition number applied to the policy set; and selecting, by the first processing system, a partition number as the first partition number where the first replica ratio function value is less than the second replica ratio function value.

7. The method of claim 6, wherein the defined value is a first defined value, and wherein determining the partition number comprises:

re-weighting, by the first processing system, the second replica ratio function value when the number of items is less than a second defined value.

8. The method of claim 7, wherein the re-weighting the second replica ratio function value includes multiplying the first replica ratio function value by log (number of items)/ Log (threshold value).

9. The method of claim 8, wherein the second defined value and the threshold value are user programmable.

10. A method for generating an efficient policy search tree, the method comprising:

accessing, by a processor, a policy set;

identifying, by the processor, items in the policy set, wherein each of the items in the policy set is a single boundary of a range to which a respective policy of the policy set is to be applied;

identifying, by the processor, a division point in a range extending over the policy set that yields a first range including a first number of the items in the policy set and a second range including as second number of the items in the policy set, wherein the first number and the second number are approximately the same number of items; and generating, by the processor, a non-equal boundary policy set search tree for the policy set, wherein the non-equal boundary policy set search tree includes at least a first node and a second node, wherein the first node is a first subset of the policy set to be applied over the first range, and wherein the second node is a second subset of the policy set to be applied over the second range, wherein said generating includes:

determining a partition number for the policy set that reduces replication of policies across different leaf nodes in the non-equal boundary policy set search tree; and performing a binary partition of the policy set at the division point when the partition number for the policy set is equal to a defined value, wherein performing the binary partition of the policy set results the first range being different from the second range and the first node.

11. The method of claim 10, the method further comprising:

configuring, by a network appliance, a processing resource of the network appliance to identify a subset of policies to be applied to a received network traffic based upon the non-equal boundary policy set search tree.

12. The method of claim 11, wherein the processing resource of the network appliance includes both a general purpose processing and a policy matching circuit.

13. The method of claim 10, further comprising:

performing, by the processor, an even partition of the policy set when the partition number for the policy set is larger than the defined value, wherein performing the even partition of the policy set results in the first range being equal the second range.

14. The method of claim 10, wherein the determining the partition number comprises:

calculating, by the processor, a first replica ratio function value for a first partition number applied to the policy set and a second replica ratio function value for a second partition number applied to the policy set; and selecting, by the processor, a partition number as the first partition number where the first replica ratio function value is less than the second replica ratio function value.

15. The method of claim 14, wherein the defined value is a first defined value, and wherein determining the partition number further comprises:

re-weighting, by the processor, the second replica ratio function value when the number of items is less than a second defined value.

16. The method of claim 15, wherein the re-weighting the second replica ratio function value includes multiplying the first replica ratio function value by log (number of items)/Log (threshold value).

17. The method of claim 10, wherein the policy set includes at least a first policy and a second policy, wherein the first policy is applicable to network traffic occurring within the first range set and the second policy is applicable to network traffic occurring within the second range set, and wherein the first range set and the second range set are not mutually exclusive and are each within an overall range of the policy set.

18. A system for selectively applying policies to network traffic, the system comprising:

a first processing system communicably including a first non-transitory computer readable medium and a second processing system communicably including a second non- transitory computer readable medium;

wherein the first non-transitory computer readable medium has stored therein instructions that when executed by the first processing system cause the first processing system to:

access a policy set; and generate a non-equal boundary policy set search tree for the policy set, wherein the non-equal boundary policy set search tree includes at least a first node and a second node, wherein the first node is a first subset of the policy set to be applied over a first range, wherein the second node is a second subset of the policy set to be applied over a second range, and wherein the first range is not equal to the second range, wherein generation of the non-equal boundary policy set search tree includes:

identifying items in the policy set in which each of the items in the policy set is a single boundary of a range to which a respective policy of the policy set is to be applied;

identifying a division point in the range that yields the first range, including a first number of the items in the policy set, and the second range, including a second number of the items in the policy set;

performing, partitioning of the policy set at the division point that reduces a number of levels of the non-equal boundary policy set search tree by:

using an even partitioning of the policy set when a partition number for the policy set is larger than a defined value, wherein performing the even partition of the policy set results in changing the first range to equal the second range; and using a binary partitioning of the policy set when the partition number for the policy set is equal to the defined value; and wherein the second non-transitory computer readable medium has stored therein instructions that when executed by the second processing system cause the second processing system to:

receive a network packet;

search for a leaf node in the non-equal boundary policy set search tree that matches the network packet, wherein the leaf node is associated with at least one policy of the policy set;

apply the at least one policy of the policy set to the network packet to yield a processed network packet; and forward the processed network packet.

19. The system of claim 18, wherein the first processing system and the second processing system are the same network appliance.

20. The method of claim 1, wherein the defined value is 2 or 3.

21. The method of claim 10, wherein the defined value is 2 or 3.

22. The system of claim 18, wherein the defined value is 2 or 3.

\* \* \* \* \*